US011320090B2

(12) United States Patent
Borg (10) Patent No.: US 11,320,090 B2
(45) Date of Patent: May 3, 2022

(54) ARM LINKAGE FOR DEVICE BEARING SPRING ARMS

(71) Applicant: OASYS Healthcare Corporation, Uxbridge (CA)

(72) Inventor: Vincent Borg, Pefferlaw (CA)

(73) Assignee: OASYS Healthcare Corporation, Uxbridge (CA)

( * ) Notice: Subject to any disclaimer, the term of this patent is extended or adjusted under 35 U.S.C. 154(b) by 0 days.

(21) Appl. No.: 17/102,343

(22) Filed: Nov. 23, 2020

(65) Prior Publication Data
US 2021/0156513 A1 May 27, 2021

Related U.S. Application Data

(60) Provisional application No. 62/938,861, filed on Nov. 21, 2019.

(51) Int. Cl.
*F16M 11/00* (2006.01)
*F16M 13/02* (2006.01)

(52) U.S. Cl.
CPC ..... *F16M 13/022* (2013.01); *F16M 2200/048* (2013.01); *F16M 2200/068* (2013.01)

(58) Field of Classification Search
CPC .. F16M 13/022; F16M 11/048; F16M 11/046; F16M 11/00; F16M 13/00
See application file for complete search history.

(56) References Cited

U.S. PATENT DOCUMENTS

| 10,760,731 | B2 * | 9/2020 | Chang | F16F 9/54 |
|---|---|---|---|---|
| 10,976,001 | B2 * | 4/2021 | Hung | F16M 11/2021 |
| 11,109,718 | B1 * | 9/2021 | Sloat | F16M 13/02 |
| 2013/0284871 | A1 * | 10/2013 | Huang | F16M 11/04 248/282.1 |
| 2018/0112820 | A1 * | 4/2018 | Lau | F16M 11/14 |
| 2018/0356031 | A1 * | 12/2018 | Zebarjad | F16M 11/2014 |
| 2020/0067290 | A1 * | 2/2020 | Hung | F16M 11/048 |
| 2020/0141536 | A1 * | 5/2020 | Ikeda | F16M 11/2014 |
| 2020/0309188 | A1 * | 10/2020 | Li | F16M 11/2014 |
| 2021/0239262 | A1 * | 8/2021 | Lim | F16M 11/08 |

* cited by examiner

*Primary Examiner* — Amy J. Sterling
(74) *Attorney, Agent, or Firm* — Jonathan M. D'Silva; MMI Intellectual Property (57) ABSTRACT

A fixed positioning mechanism for a spring arm of a pendant system comprises a base link, a load link, and a transfer link. The base link and transfer link share a first pivot. The load link comprises a fine load adjustment adjacent the first pivot. A second pivot at the fine load adjustment. The transfer link comprises a slidable rod assembly having a first end and a second end, a spring situated over the rod assembly, and a third pivot mounted on the first end. The load link comprises a curved or offset body such that rotation of the transfer link below horizontal allows the base link to intersect a plane defined by the second and third pivot.

9 Claims, 16 Drawing Sheets

ARM LINKAGE FOR DEVICE BEARING SPRING ARMS

BACKGROUND

Pendant systems are used in medical settings to hold and position diagnostic equipment, lights, displays and other healthcare equipment. Pendant systems are typically mounted to the ceiling and are typically integrated with power and utility lines which clears up space and removes tripping hazards from the floor. The medical devices are mounted to a spring arm that is movable and allows the positioning of the device where it is required. There is a need to create pendant systems in which the spring arms can be moved in as wide an arc as possible and accommodate a wide range of devices of differing size and weight. What is presented is an improved arm linkage for spring arms that allows an improved range of movement for a wide range of device loads.

SUMMARY

A fixed positioning mechanism for a spring arm of a pendant system is presented. The pendant system for the manipulation and maintained support of a device mounted to the spring arm. The fixed positioning mechanism comprises a base link, a load link, and a transfer link. The base link and the transfer link share a first pivot. The load link further comprises a fine load adjustment adjacent the first pivot. The fine load adjustment is actuatable to be moved towards or away from the first pivot. A second pivot is at the fine load adjustment. The transfer link further comprising a slidable rod assembly having a first end and a second end, a spring situated over said rod assembly, a third pivot mounted on the first end of the rod assembly, and a compression member adjustably attached to the second end of the rod assembly for coarse adjustment of said spring's preload. The load link extends between the second pivot and the third pivot such that actuation of the fine load adjustment towards or away from the first pivot will respectively increase or decrease the distance between the first pivot and the third pivot corresponding to a fine increase or decrease in said spring's preload. The load link further comprises a curved or offset body such that rotation of the transfer link below horizontal allows the base link to intersect a plane defined by the second pivot and the third pivot regardless of the positioning of the fine load adjustment.

The compression member is actuated to set a load range followed by actuation of the fine load adjustment to set an exact weight within the load range to accommodate the weight of the device attached to the spring arm such that the gravitational force acting on the device will be balanced by the spring for maintaining the position of the device. In some embodiments, the compression member and the fine load adjustment are covered by removable windows for easy user access.

In some embodiments, the base link has a pivotable mounting shaft for 360-degree rotation of the spring arm about a fixed base or other member of the pendant system. In some embodiments, the spring arm has a 120-degree range of motion which could be +45-degrees to −75-degrees from horizontal.

Those skilled in the art will realize that this invention is capable of embodiments that are different from those shown and that details of the devices and methods can be changed in various manners without departing from the scope of this invention. Accordingly, the drawings and descriptions are to be regarded as including such equivalent embodiments as do not depart from the spirit and scope of this invention.

BRIEF DESCRIPTION OF DRAWINGS

For a more complete understanding and appreciation of this invention, and its many advantages, reference will be made to the following detailed description taken in conjunction with the accompanying drawings.

DETAILED DESCRIPTION

Referring to the drawings, some of the reference numerals are used to designate the same or corresponding parts through several of the embodiments and figures shown and described. Corresponding parts are denoted in different embodiments with the addition of lowercase letters. Variations of corresponding parts in form or function that are depicted in the figures are described. It will be understood that variations in the embodiments can generally be interchanged without deviating from the invention.

Figure 1:
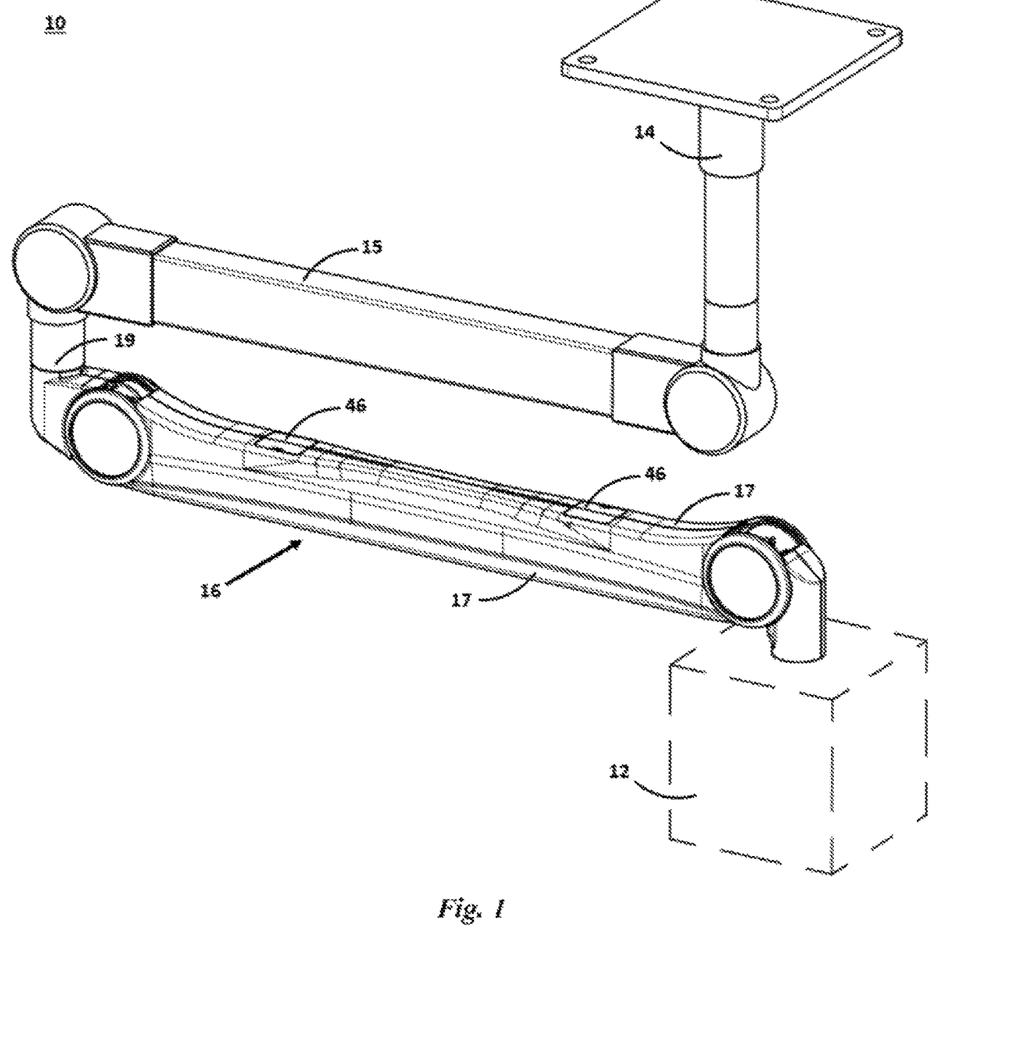
FIG. 1 shows a perspective view of a pendant system bearing a generic device on a spring arm in a horizontal position.

As shown in FIG. 1, pendant systems 10 are commonly used in healthcare applications to hold devices 12 within a room where they are needed and they can be easily moved and held in position. Pendant systems 10 are typically mounted on a fixed base 14 and mounted to a ceiling mounted mechanism, as shown in the Figures or onto a wall mounted mechanism, a mobile mounted mechanism (Floor Stand or cart) or even fixed to a floor mounted mechanism. Pendant systems 10 have a series of pivot arms 15 and spring arms 16. A device 12 is mounted to the end of a spring arms 16 allowing the device 12 to be manipulated and remain supported in positions as needed. The pendant systems 10 may incorporate power, electronics, sensors, fluid lines, etc. which could be used to connect to whatever device 12 is mounted to the pendant system. Devices 12 that could be mounted to pendant systems 10 include but are not limited to lights, display screens, monitors, gas or fluid supply, etc. There are many types of pendant systems 10 with a variety of pivot arms 15 and spring arm 16 types which provide a variety of options for maneuvering and positioning whatever device 12 is mounted to the spring arm 16.

Figure 2:
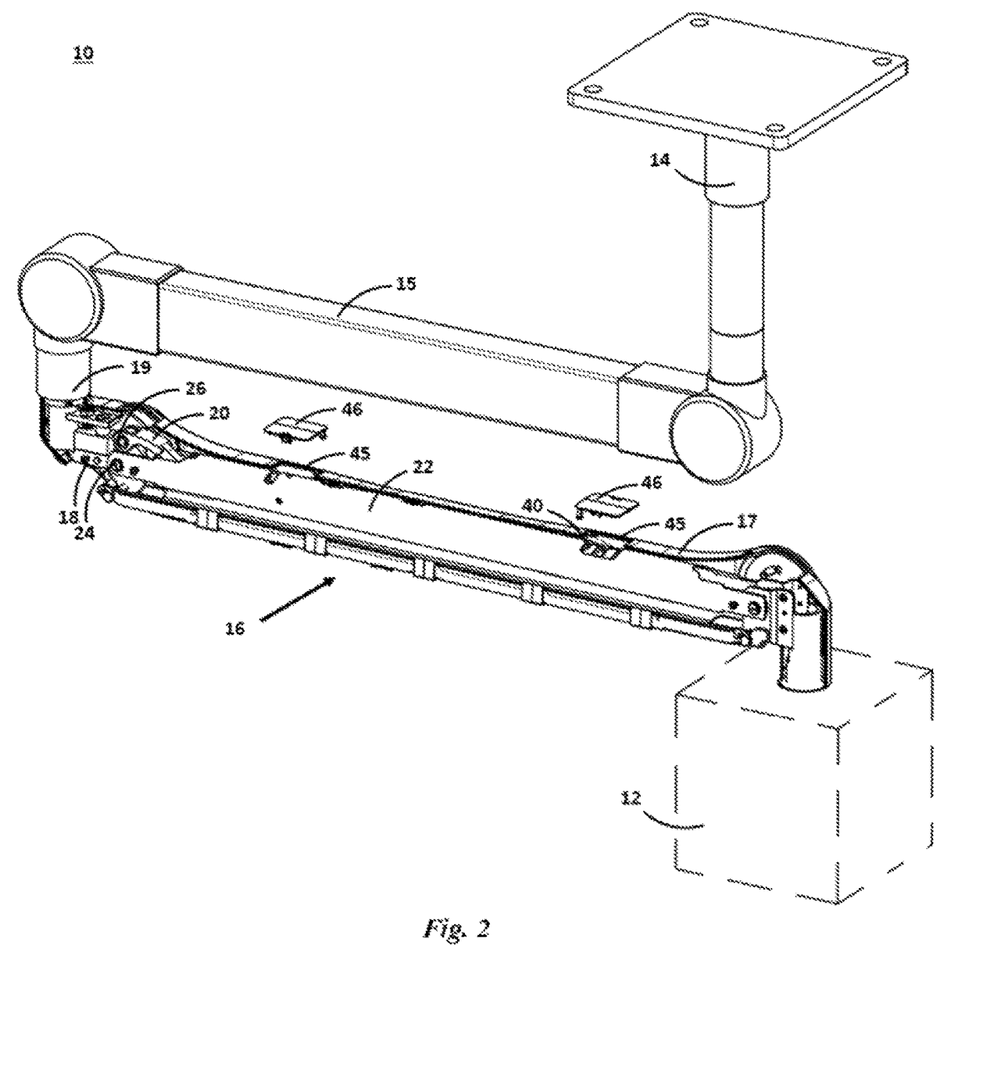
FIG. 2 is the pendant system of FIG. 1 with part of the outer cover of the spring arm removed to show its inner components.
Figure 3:
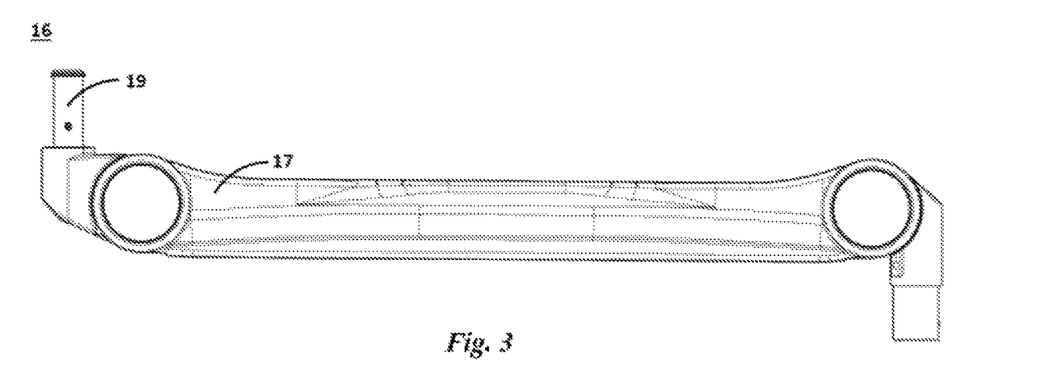
FIG. 3 is a side view of the spring arm of FIG. 1.
Figure 4:
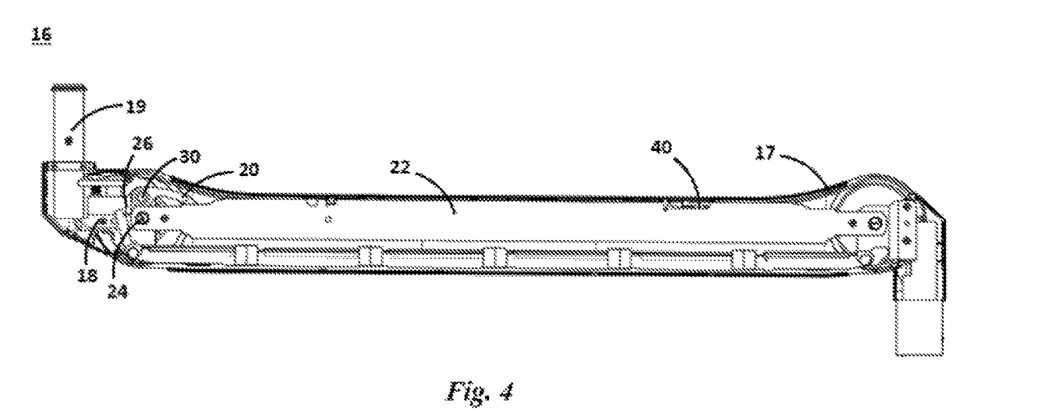
FIG. 4 is a side view of the spring arm of FIG. 3 with part of the outer cover removed to show the inner components.
Figure 5:
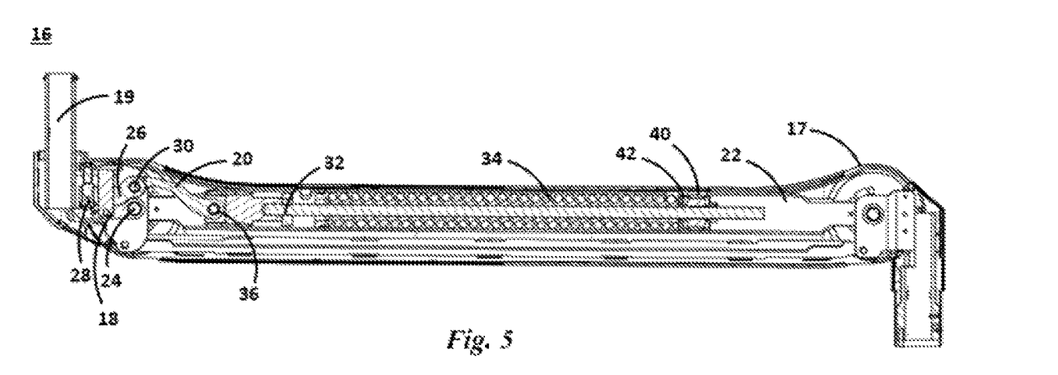
FIG. 5 is a cross-section view of the spring arm of FIG. 3 with the fine load adjustment in the fully lowered position.
Figure 6:
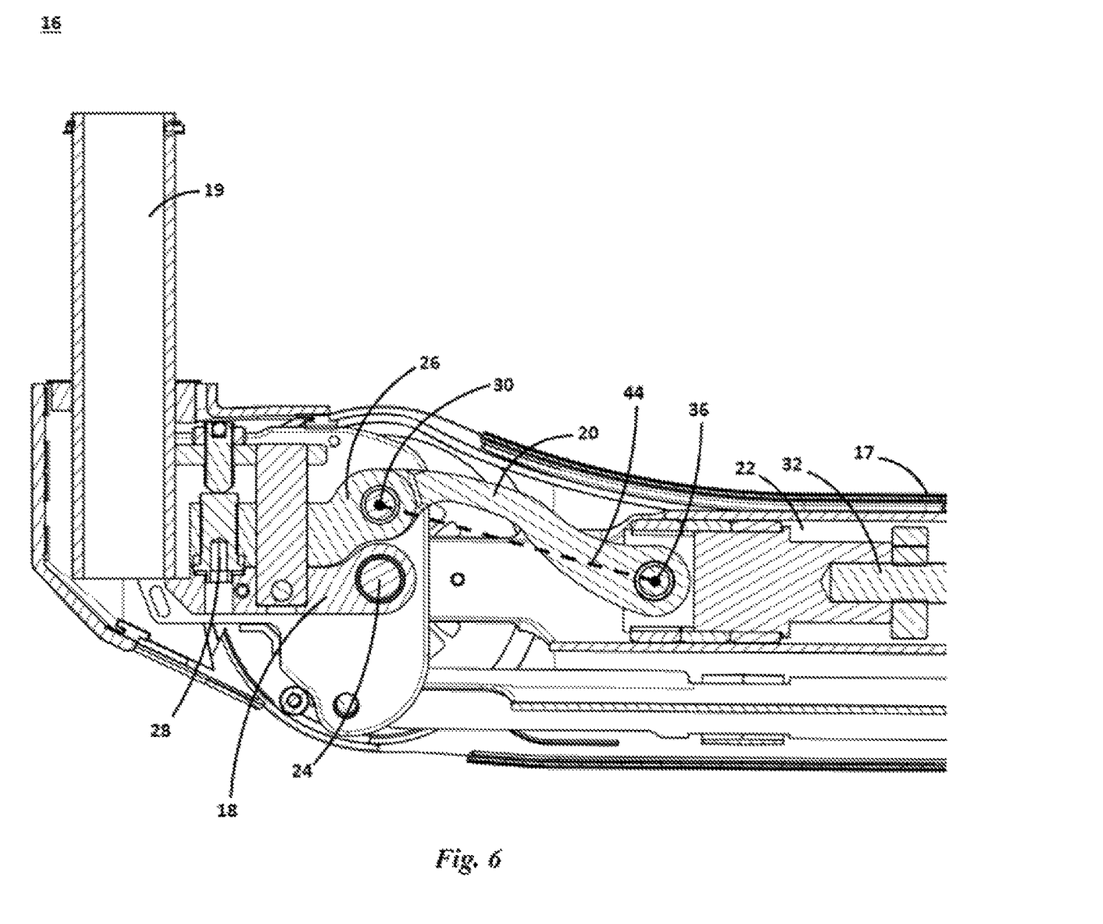
FIG. 6 is a close up of the cross-section view of the fixed positioning mechanism of the spring arm of FIG. 5.
Figure 7:
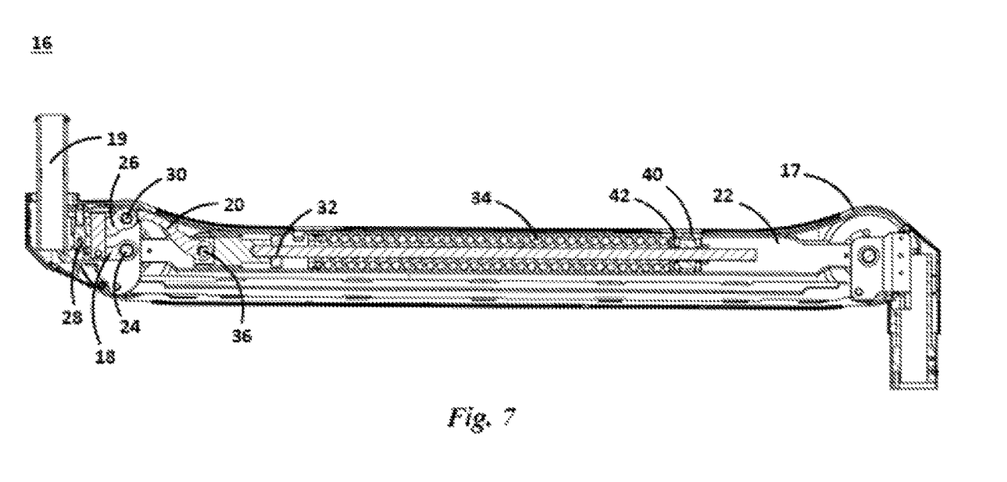
FIG. 7 is a cross-section view of the spring arm of FIG. 3 with the fine load adjustment in the fully raised position.
Figure 8:
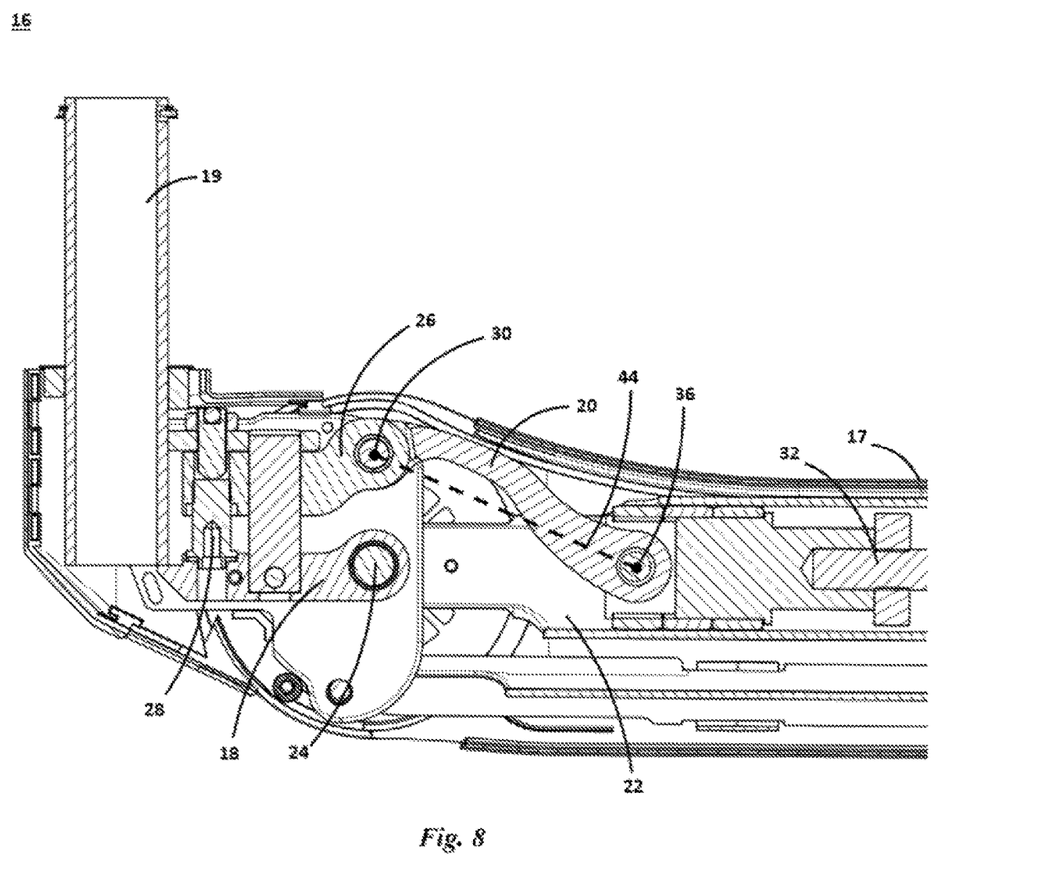
FIG. 8 is a close up of the cross-section view of the fixed positioning mechanism of the spring arm of FIG. 7.

FIG. 2 shows the pendant system 10 of FIG. 1 with the outer covers 17 removed from the spring arm 16 to show its internal components. FIGS. 3 and 4 shows a side view of the spring arm 16 and a side view of the spring arm with the outer covers 17 removed, respectively. FIG. 5 is a cross-section view of the spring arm. FIG. 6 shows a close up cut out view of a fixed positioning mechanism for a spring arm 16. As best understood by comparing FIGS. 3 through 6, the fixed positioning mechanism of the spring arm 16 comprises a base link 18, a load link 20, and a transfer link 22. The base link 18 has a pivotable mounting shaft 19 for 360-degree rotation of the spring arm 16 about the fixed base 14 or other member of the pendant system 10. The base link 18 and the transfer link 22 share a first pivot 24. The load link 20 comprises a fine load adjustment 26 adjacent the first pivot 24. The fine load adjustment 26 is actuatable to be moved towards or away from the first pivot 26 by the use of an adjustment screw 28. A second pivot 30 is located at the fine load adjustment 26.

The transfer link 22 comprises a slidable rod assembly 32 having a first end and a second end. As best seen in FIG. 5, a spring 34 is situated over the rod assembly 32. A third pivot 36 is mounted on the first end of the rod assembly. A compression member 40 is adjustably attached to the second end of the rod assembly 32 for coarse adjustment of the spring's 34 preload.

As best understood by comparing FIGS. 5 through 8, the load link 20 extends between the second pivot 30 and the third pivot 36 such that actuation of the fine load adjustment 26 towards or away from the first pivot 24 will respectively increase or decrease the distance between the first pivot 24 and the third pivot 36 corresponding to a fine increase or decrease in the spring's 34 preload. As discussed in more detail below, the compression member 40 is actuated by adjusting the adjustment nut 42 to set a load range followed by actuation of the fine load adjustment 26 to set an exact weight within the load range to accommodate the weight of the device 12 attached to the spring arm 16 such that the gravitational force acting on the device 12 will be balanced by the spring 34 for maintaining the position of the device 12.

Figure 9:
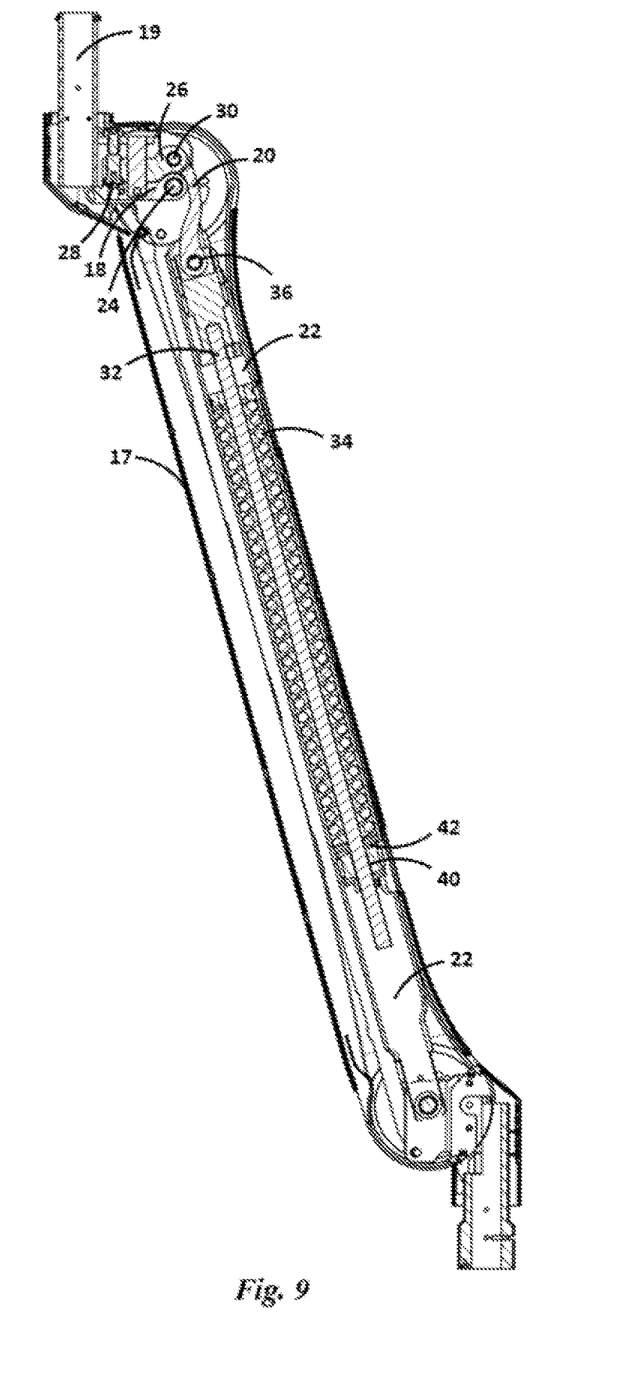
FIG. 9 is a cross-section view of the spring arm of FIG. 3 rotated to its fullest extent below horizontal with the fine load adjustment in the fully lowered position.
Figure 10:
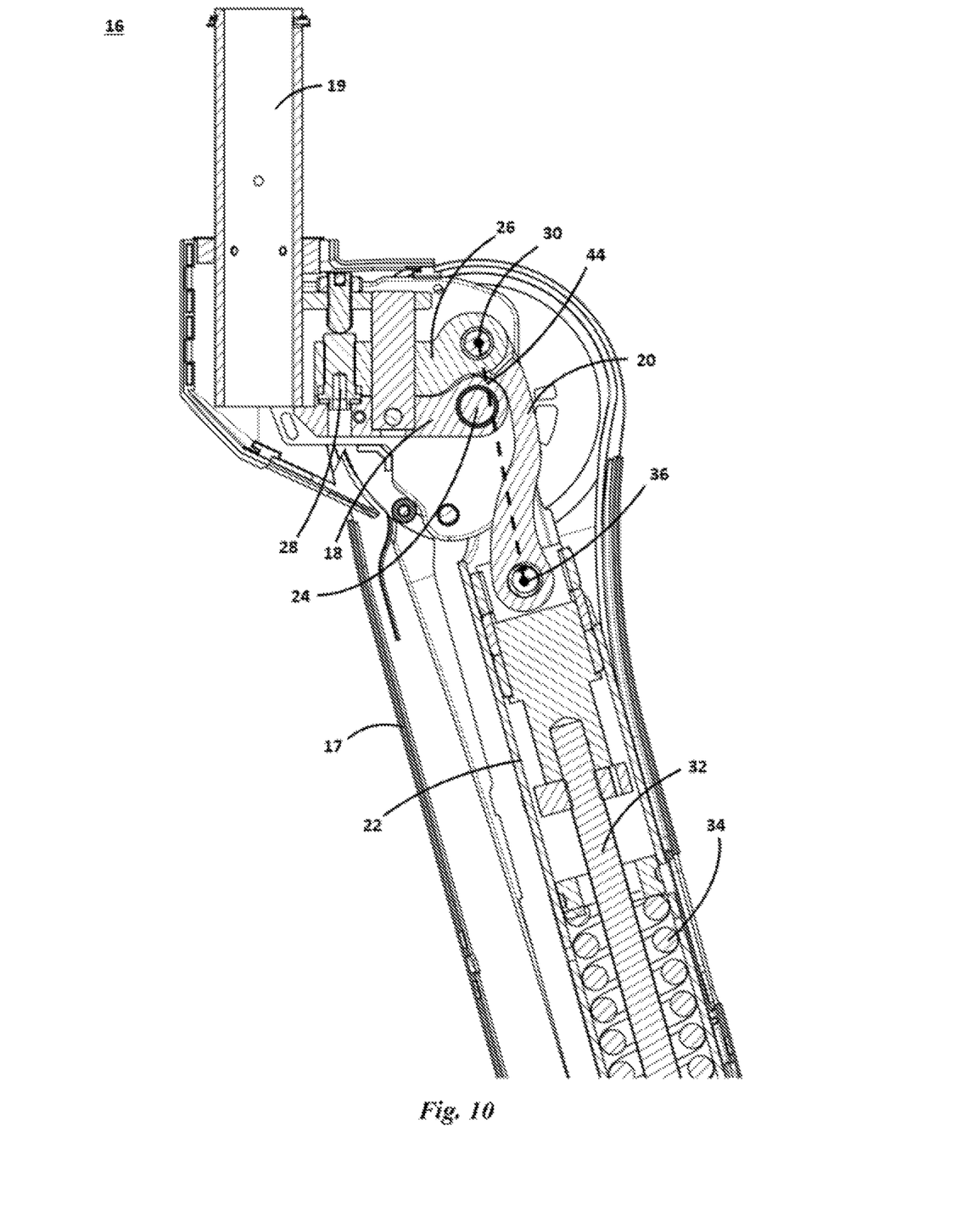
FIG. 10 is a close up of the fixed positioning mechanism of the cross-section view of FIG. 9.
Figure 11:
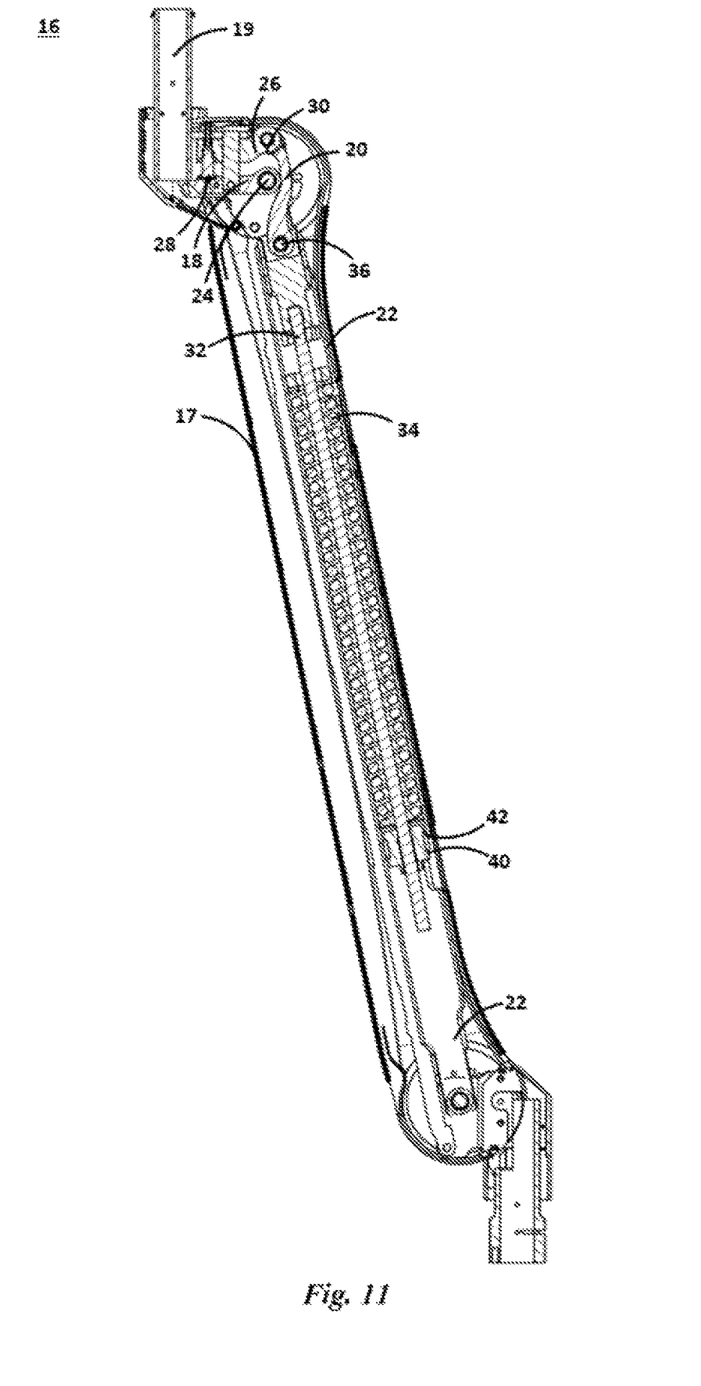
FIG. 11 is a cross-section view of the spring arm of FIG. 3 rotated to its fullest extent below horizontal with the fine load adjustment in the fully raised position.
Figure 12:
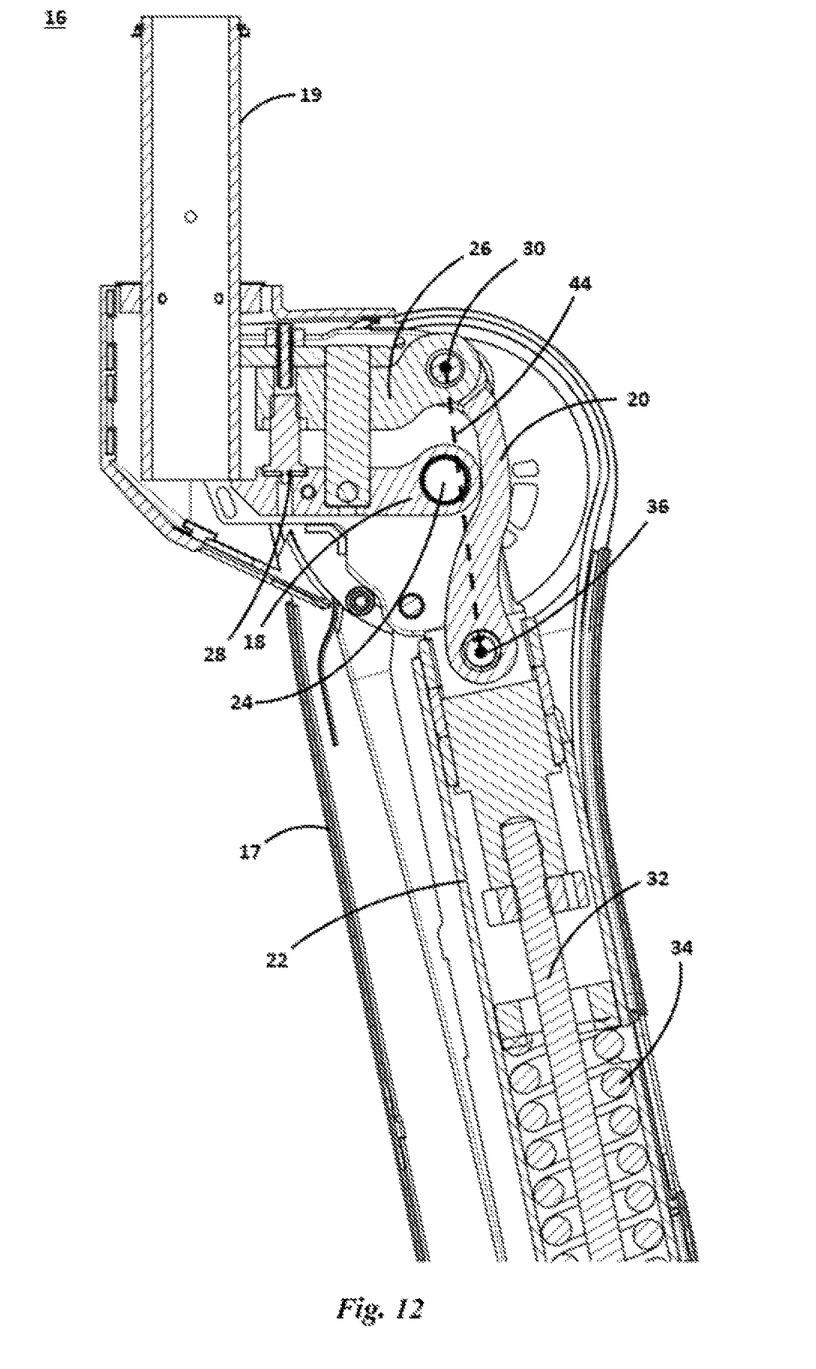
FIG. 12 is a close up of the cross-section view of FIG. 11.

In this embodiment, the load link 20 comprises a curved body such that rotation of the transfer link 22 below horizontal allows the base link 18 to intersect a plane 44 defined by the second pivot 30 and the third pivot 36 regardless of the positioning of the fine load adjustment 26. FIGS. 9 and 10 show the spring arm 16 rotated to its fullest extent below horizontal with the fine load adjustment 26 at its fully lowered position. FIGS. 11 and 12 show the spring arm 16 rotated to its fullest extent below horizontal with the fine load adjustment 26 at its fully lowered position. In both extremes, the base link 18 intersects the plane 44 defined by the second pivot 30 and the third pivot 36. The configuration of the load link 20 is such a way allows the movement of spring arm 16 in arcs that prior art configurations are not able to achieve. The curved body of the load link 20 allows the rotation of the spring arm 16 to not be blocked by the base link 18 which would otherwise have stopped such movement. This allows the spring arm 16 to have a range of motion that exceeds typical pendant systems in the prior art. Spring arms 16 incorporating such load links 20 have a 120-degree range of motion. The spring arm 16 shown in the figures has a range of motion of +45-degrees to −75-degrees from horizontal.

Figure 13:
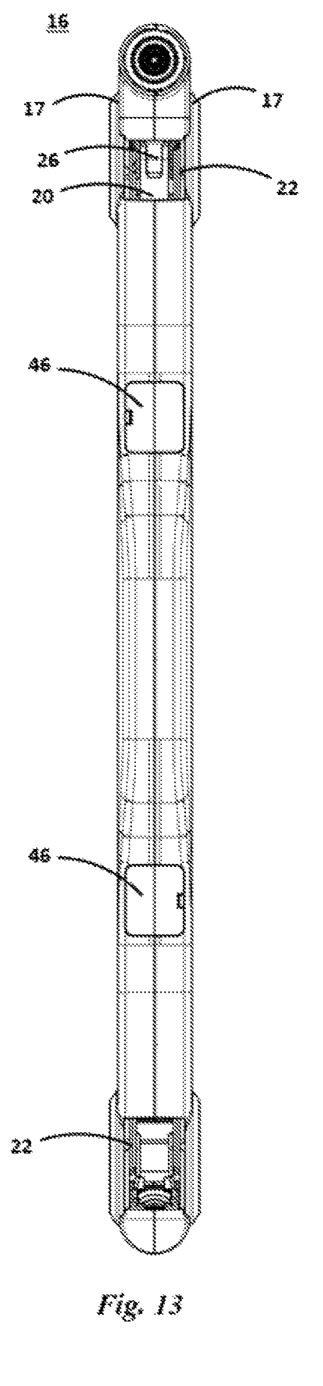
FIG. 13 is a top view of the spring arm of FIG. 3.
Figure 14:
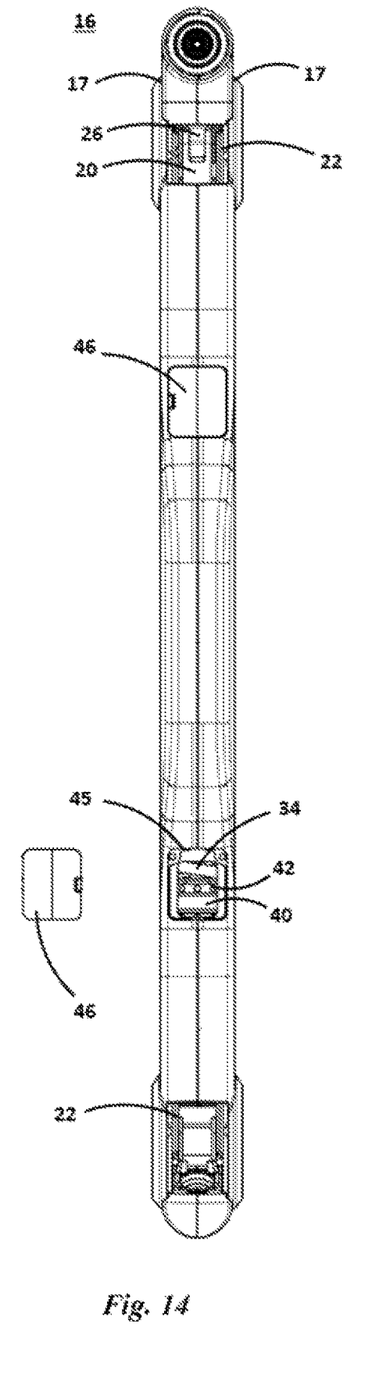
FIG. 14 is the spring arm of FIG. 13 with the removable window showing access to the adjustment nut.
Figure 15:
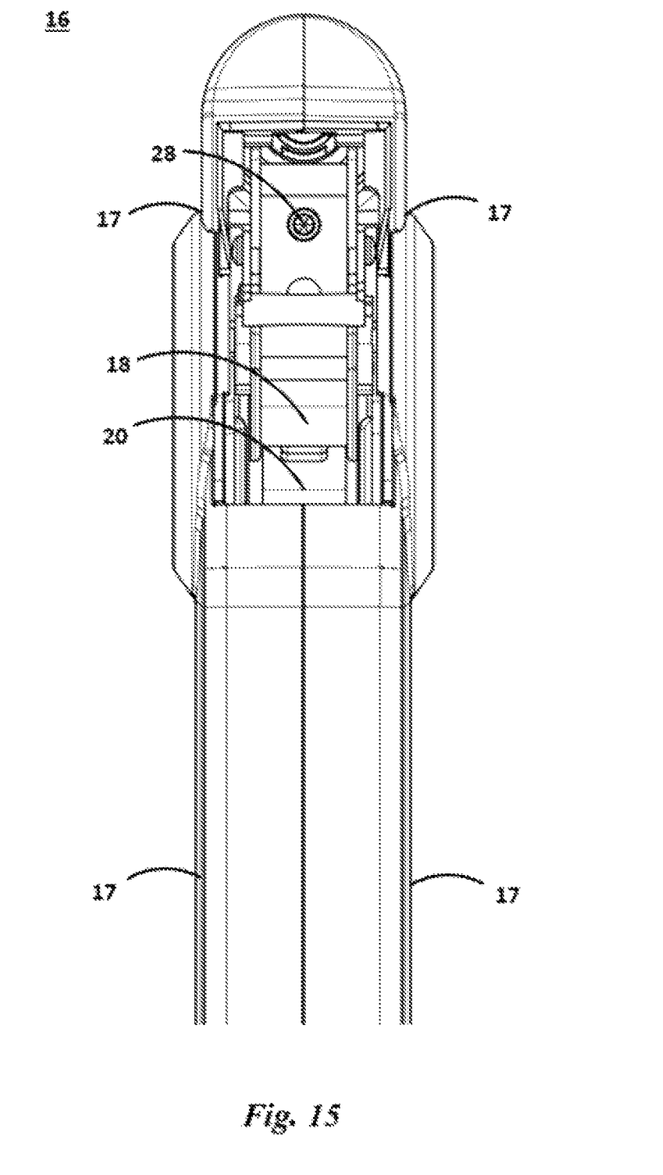
FIG. 15 is a close up bottom view of the fixed positioning mechanism of the spring arm of FIG. 3 showing access to the adjustment screw.

As can be seen in FIGS. 13 and 14, there are openings 45 in the outer cover 17 of the spring arm 16 which may be covered by removable windows 46 for easy user access to the adjustment nut 42 of the compression member 40. FIG. 15 shows how the adjustment screw 28 of the fine load adjustment 26 can be accessed from the bottom of the spring arm 16. As discussed earlier, the spring 34 can be preloaded—i.e. have its load capacity preset—so that the spring arm 16 is able to hold its position at any point within its range of motion while bearing the load of a device 12 mounted to it (shown in FIGS. 1 and 2).

Figure 16:
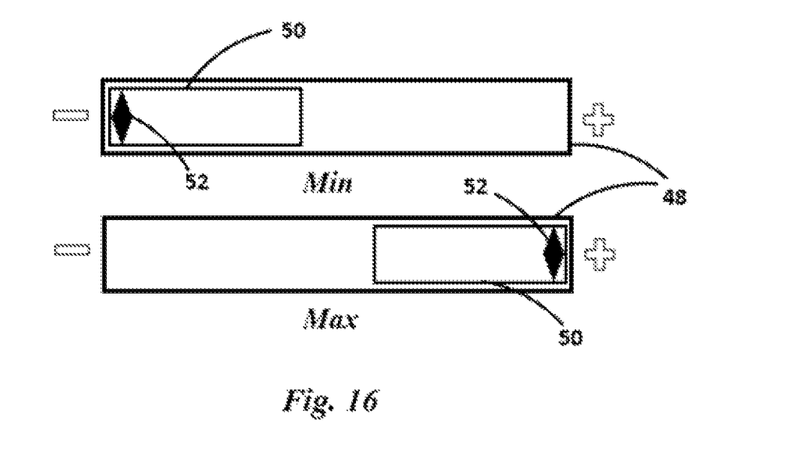
FIG. 16 is a schematic illustrating the range of adjustment of the coarse and fine adjustment of the spring preload.

FIG. 16 is a conceptual depiction of the levels of adjustment using a double box analogy. The outer box 48 represents the total range of adjustment the spring 34. Actuation of the adjustment screw 28 moves the fine load adjustment 26 and moves the conceptual inner box 50 within the outer box 48. Actuation of the adjustment nut 42 represents coarse adjustment of the compression member 40 and moves the diamond 52 within the inner box 50. Please note that the double box is purely conceptual; there is no physical double box. It is also important to note that the diamond 52 moves with the inner box 50 when adjusting the adjustment screw 28. However, adjusting the adjustment nut 42 moves the diamond 52 independently from the inner box 50. Thus, there are many possible ways to achieve a given target. Furthermore, the range of the diamond 52 is not strictly bound by the inner box 50; it is possible to move it beyond the limits of the inner box 50 as long as the adjustment nut 42 can be reached by the adjustment tool. However, the inner box 50 imposes a constraint on the effectiveness of adjusting the diamond 52. If the adjustment nut 42 is turned to the point where the diamond 52 is outside the inner box 50, any further adjustment of the adjustment nut 42 in that direction will not correctly calibrate the spring 34, despite the possibility of the diamond 52 aligning with the target capacity. The upper depiction shows the minimum setting for the spring 34 preload and the lower depiction shows the maximum setting for the spring 34 preload.

Figure 17:
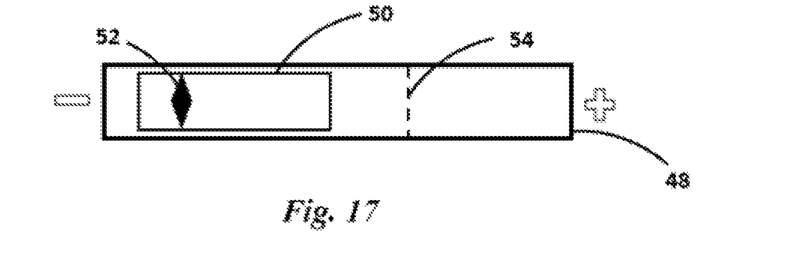
FIG. 17 is a schematic showing an example spring preload adjustment scenario.
Figure 18:
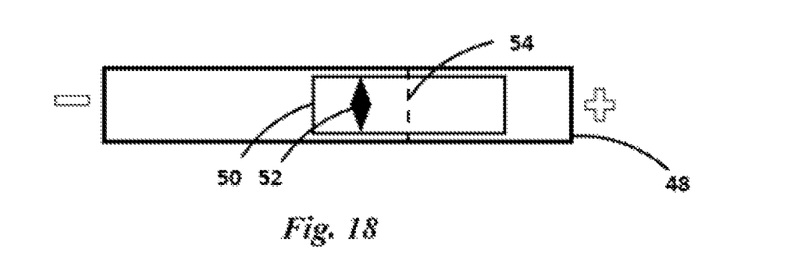
FIG. 18 shows the example spring preload adjustment scenario of FIG. 17 after the fine adjustment has been set.
Figure 19:
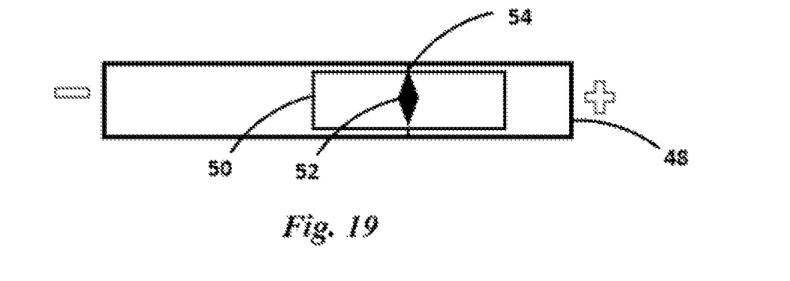
FIG. 19 shows the example spring preload adjustment scenario of FIG. 18 after the coarse adjustment has been set.

FIGS. 17-19 illustrate an example scenario for calibration of the spring 34 preload. Comparing to FIG. 5, in this scenario, FIG. 17 shows the spring arm 16 is expected to bear a device 12 that weighs 15 kg and the spring 34 preload must be set to that target weight 54 and it is currently set to 12 kg. A spring 34 that is improperly calibrated will cause the spring arm 16 to drift upwards or downwards. If the spring 34 has insufficient tension, the spring arm 16 will drift downwards. If the spring's 34 compression is too high, the spring arm 16 will drift upwards. As the target weight 54 is outside the range of what can be met solely by turning the adjustment nut 42, the solution would be to turn the adjustment screw 28 to move the inner box 50 as shown in FIG. 18 and if that adjustment overshoots the target weight 54, then turn the adjustment nut 42 to move the diamond 52 within the inner box 50 to go back to the target weight 54 as shown in FIG. 19.

Figure 20:
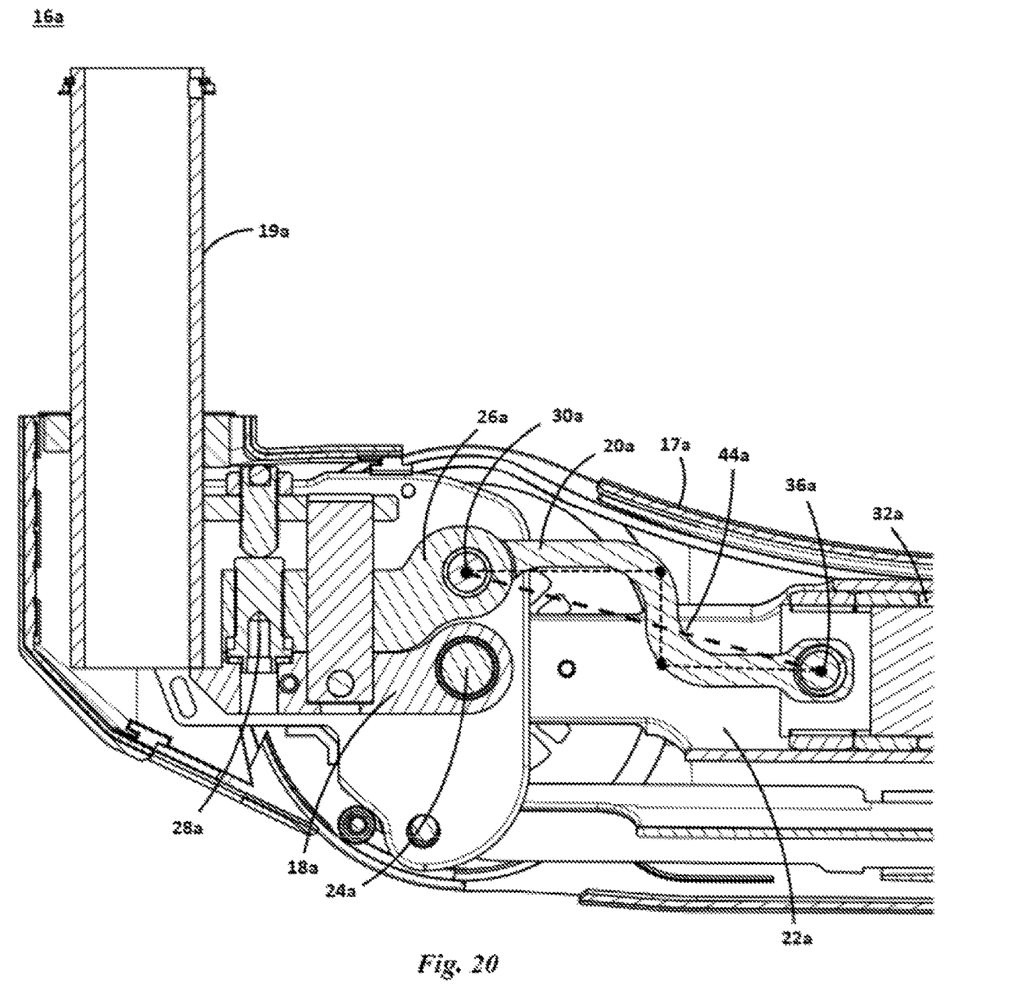
FIG. 20 shows a close up cross-sectional view of the fixed positioning mechanism of another embodiment of spring arm in which the base link has an offset shape.

FIG. 20 shows another embodiment of spring arm 16a with another embodiment the load link 20a. In this embodiment, the load link 20a comprises an offset body rather than a curved body such that rotation of the transfer link 22a below horizontal allows the base link 18a to intersect a plane 44a defined by the second pivot 30a and the third pivot 36a regardless of the positioning of the fine load adjustment 26a. Other designs of load links 20a are possible so long as the body is shaped to allow the base link 18a to intersect a plane 44a defined by the second pivot 30a and the third pivot 36a regardless of the positioning of the fine load adjustment 26a and to allow the rotation of the spring arm 16a to not be blocked by base link 18a.

Figure 21:
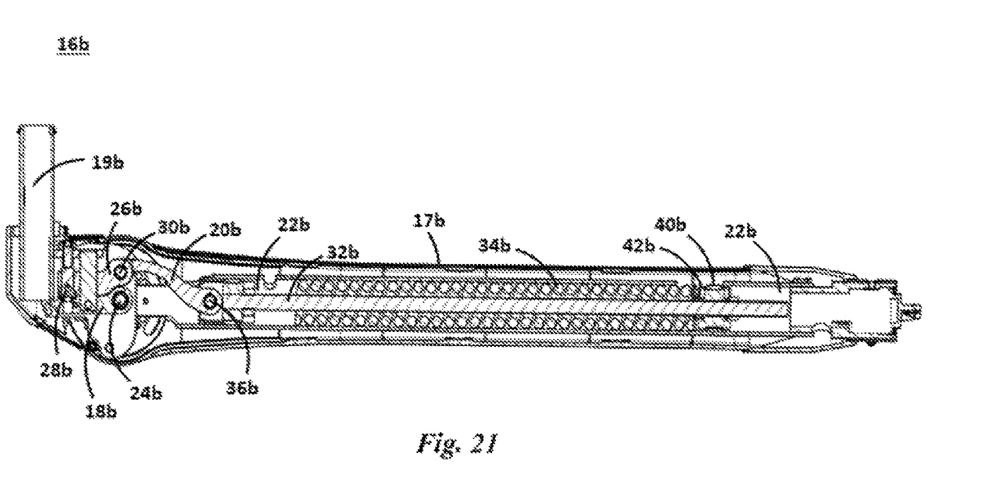
FIG. 21 is a cross-section view of another embodiment of spring arm.
Figure 22:
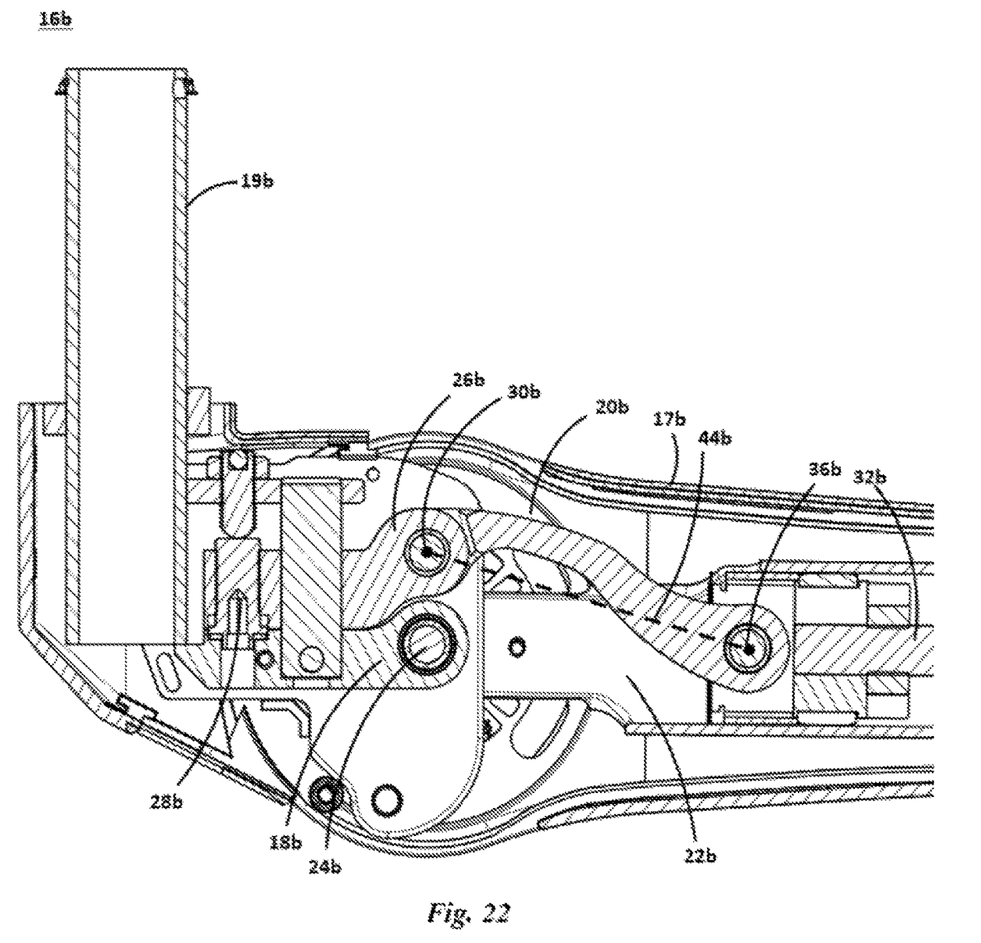
FIG. 22 is a close up of the cross-section view of the fixed positioning mechanism of the spring arm.

FIGS. 21 and 22 show another embodiment of spring arm 16b having a different internal configurations or linkages showing the improvements to the fixed positioning mechanism disclosed herein.

This invention has been described with reference to several preferred embodiments. Many modifications and alterations will occur to others upon reading and understanding the preceding specification. It is intended that the invention be construed as including all such alterations and modifications in so far as they come within the scope of the appended claims or the equivalents of these claims.

The invention claimed is:

1. A fixed positioning mechanism for a spring arm of a pendant system, the pendant system for the manipulation and maintained support of a device mounted to the spring arm, the fixed positioning mechanism comprising:
    a base link, a load link, and a transfer link;
    said base link and said transfer link share a first pivot;
    said load link further comprising a fine load adjustment adjacent said first pivot, said fine load adjustment actuatable to be moved towards or away from said first pivot;
    a second pivot at said fine load adjustment;
    said transfer link further comprising a slidable rod assembly having a first end and a second end, a spring situated over said rod assembly, and a third pivot mounted on said first end of said rod assembly;
    said load link extending between said second pivot and said third pivot such that actuation of said fine load adjustment towards or away from said first pivot will respectively increase or decrease the distance between said first pivot and said third pivot; and
    said load link further comprising a curved or offset body such that rotation of said transfer link below horizontal allows said base link to intersect a plane defined by said second pivot and said third pivot regardless of the positioning of said fine load adjustment.

2. The fixed positioning mechanism of claim 1 further comprising said base link has a pivotable mounting shaft for 360-degree rotation of the spring arm about a fixed base or other member of the pendant system.

3. The fixed positioning mechanism of claim 1 further comprising said spring arm has a 120-degree range of motion.

4. The fixed positioning mechanism of claim 1 further comprising said spring arm has a range of motion of +45-degrees to −75-degrees from horizontal.

5. The fixed positioning mechanism of claim 1 further comprising said fine load adjustment is covered by removable windows for easy user access.

6. A fixed positioning mechanism for a spring arm of a pendant system, the pendant system for the manipulation and maintained support of a device mounted to the spring arm, the fixed positioning mechanism comprising:
    a base link, a load link, and a transfer link;
    said base link and said transfer link share a first pivot;
    said load link further comprising a fine load adjustment adjacent said first pivot, said fine load adjustment actuatable to be moved towards or away from said first pivot;
    a second pivot at said fine load adjustment;
    said transfer link further comprising a slidable rod assembly having a first end and a second end, a spring situated over said rod assembly, a third pivot mounted on said first end of said rod assembly, and a compression member adjustably attached to said second end of said rod assembly for coarse adjustment of said spring's preload;
    said load link extending between said second pivot and said third pivot such that actuation of said fine load adjustment towards or away from said first pivot will respectively increase or decrease the distance between said first pivot and said third pivot corresponding to a fine increase or decrease in said spring's preload; and
    said compression member is actuated to set a load range followed by actuation of said fine load adjustment to set an exact weight within said load range to accommodate the weight of the device attached to the spring arm such that the gravitational force acting on the device will be balanced by said spring for maintaining the position of the device.

7. The fixed positioning mechanism of claim 6 further comprising said base link has a pivotable mounting shaft for 360-degree rotation of the spring arm about a fixed base or other member of the pendant system.

8. The fixed positioning mechanism of claim 6 further comprising said spring arm has a 120-degree range of motion.

9. The fixed positioning mechanism of claim 6 further comprising said compression member and said fine load adjustment are covered by removable windows for easy user access.

* * * * *